(12) United States Patent
Hirai et al.

(10) Patent No.: US 7,507,447 B2
(45) Date of Patent: Mar. 24, 2009

(54) TRANSPARENT CONDUCTIVE FILM, METHOD FOR PRODUCING SAME AND METHOD FOR FORMING PATTERN

(75) Inventors: Hiroyuki Hirai, Minami-ashigara (JP); Yasushi Araki, Minami-ashigara (JP); Yoshio Tadakuma, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 518 days.

(21) Appl. No.: 10/372,930

(22) Filed: Feb. 26, 2003

(65) Prior Publication Data

US 2003/0224162 A1 Dec. 4, 2003

(30) Foreign Application Priority Data

Feb. 26, 2002 (JP) ............... 2002-049633
Feb. 26, 2002 (JP) ............... 2002-049634

(51) Int. Cl.
*C08F 2/48* (2006.01)
*B05D 1/12* (2006.01)
*B05D 3/00* (2006.01)
*C23C 14/28* (2006.01)
*C23C 14/30* (2006.01)
*H05B 6/00* (2006.01)
*H05B 7/00* (2006.01)

(52) U.S. Cl. ............... 427/508; 427/180; 427/190; 427/191; 427/192; 427/595; 427/596

(58) Field of Classification Search ............... 427/180, 427/190, 191, 192, 595, 596
See application file for complete search history.

(56) References Cited

U.S. PATENT DOCUMENTS

| 4,390,586 | A | * | 6/1983 | Lemelson | ............... 428/209 |
| 4,859,364 | A | * | 8/1989 | Yamamoto et al. | ............... 252/512 |
| 5,587,111 | A | * | 12/1996 | Watanabe et al. | ............... 252/514 |
| 6,268,014 | B1 | * | 7/2001 | Eberspacher et al. | ............... 427/74 |
| 6,348,295 | B1 | * | 2/2002 | Griffith et al. | ............... 430/198 |
| 6,881,448 | B1 | * | 4/2005 | Hattori | ............... 427/307 |

FOREIGN PATENT DOCUMENTS

| JP | 11-031417 A | 2/1999 |
| JP | 2000-248366 A | 9/2000 |

\* cited by examiner

*Primary Examiner*—Timothy Meeks
*Assistant Examiner*—Kelly M. Stouffer
(74) *Attorney, Agent, or Firm*—Buchanan Ingersoll & Rooney PC

(57) ABSTRACT

Disclosed is a method for producing a transparent conductive film comprising a coating step for coating a coating solution containing metal nanoparticles on a substrate to form a coated layer, a drying step for drying the coated layer and a baking step for baking the coated layer to obtain a transparent conductive film, wherein a metal in the metal nanoparticles is oxidized to a metal oxide during at least one of the coating step, the drying step and the baking step. According to this method, a transparent conductive film having a low specific resistance and a high light transmittance can be produced by coating.

7 Claims, No Drawings

TRANSPARENT CONDUCTIVE FILM, METHOD FOR PRODUCING SAME AND METHOD FOR FORMING PATTERN

TECHNICAL FIELD

The present invention relates to a method for producing a transparent conductive film used for an electrode or the like, and a method for forming a pattern of a transparent conductive film. The present invention also relates to transparent conductive films produced by these methods.

RELATED ART

In recent years, many liquid crystal displays, electroluminescence displays and so forth are used as displays. In these displays, transparent electrodes are used for display devices and driving circuit portions. For the transparent conductive films, metal oxide films having small resistance and sufficient transparency are suitable. As a method of forming a metal oxide film on a substrate, the sputtering method, the vacuum deposition method, the ion beam method and so forth are known. These methods require expensive installations such as vacuum apparatuses, and therefore the production cost increases. Further, since the films are produced in vacuum, the size of producible thin film is limited, and it is difficult to produce large transparent conductive films by these methods.

As another method of forming a transparent conductive film, film formation methods based on coating are being investigated. For example, a method of coating a paste prepared by mixing and uniformly dispersing a conductive metal oxide such as ITO, ATO or IZO in a solvent together with a binder or resin on a substrate and baking the coated film is known. This method has advantages that the size of the substrate is not limited, and a special film formation apparatus is not required, and it is useful when the film is used as an antistatic film etc. However, when the film is used as a transparent electrode, there arises a problem that sufficient conductivity cannot be obtained. It is considered that the decrease of conductivity in a conductive film formed by the coating method is caused because a binder and other additives exist at the time of coating and baking and prevent contact of conductive metal oxide particles to inhibit manifestation of sufficient conductivity.

As a method for solving the problem, for example, Japanese Patent Laid-open Publication (Kokai) No. 5-24836 discloses a method of improving the contact of particles by controlling the shape of the conductive metal oxide particles. However, in this method, unless volume of particles once deposited from a vapor phase changes, further increase of contacting area cannot be expected.

In general, volume of metal is increased when the metal bonds to oxygen. For example, the density of metal indium is 7.31 g/cm$^3$, whereas the density of indium oxide ($In_2O_3$) is 7.18 g/cm$^3$. This clearly indicates that volume of metal indium particles increases when indium constituting the particles bonds to oxygen. Further, if the particle size is a nano size, metal nanoparticles are readily oxidized even at room temperature and become metal oxide particles.

The first object of the present invention is to provide a method for producing a transparent conductive film having a low specific resistance and a high light transmittance. The second object of the present invention is to provide a method for producing a transparent conductive film, which enables production of a transparent conductive film of a large area by a simple operation. The third object of the present invention is to provide a method for producing a transparent conductive film that can be formed even on a substrate having a low heat resistance such as plastic substrates. The fourth object of the present invention is to provide a method for forming a pattern of a transparent conductive film, which enables easy and quick patterning and exhibits high productivity.

SUMMARY OF THE INVENTION

The aforementioned first and second objects were achieved by a method for producing a transparent conductive film comprising a coating step for coating a coating solution containing metal nanoparticles on a substrate to form a coated layer, a drying step for drying the coated layer and a baking step for baking the coated layer to obtain a transparent conductive film, wherein a metal in the metal nanoparticles is oxidized to a metal oxide during at least one of the coating step, the drying step and the baking step (first invention).

The aforementioned third object was achieved by a method for producing a transparent conductive film which comprises the steps of coating a colloidal dispersion of metal nanoparticles on a substrate to form a coated layer, drying the coated layer and subjecting the coated layer to laser irradiation, wherein the colloidal dispersion contains (1) a mixture of nanoparticles containing a metal and nanoparticles containing at least one substance selected from the group consisting of a metal oxide hardly soluble in water, a metal hydroxide hardly soluble in water and a metal carbonate hardly soluble in water, and/or (2) composite metal nanoparticles each containing a metal and at least one substance selected from the group consisting of a metal oxide hardly soluble in water, a metal hydroxide hardly soluble in water and a metal carbonate hardly soluble in water (second invention).

The aforementioned fourth object was achieved by a method for forming a pattern of a transparent conductive film which comprises the steps of coating a colloidal dispersion of metal nanoparticles on a substrate to form a coated layer, drying the coated layer and subjecting the coated layer to laser irradiation according to the pattern, wherein the colloidal dispersion contains (1) a mixture of nanoparticles containing a metal and nanoparticles containing at least one substance selected from the group consisting of a metal oxide hardly soluble in water, a metal hydroxide hardly soluble in water and a metal carbonate hardly soluble in water, and/or (2) composite metal nanoparticles each containing a metal and at least one substance selected from the group consisting of a metal oxide hardly soluble in water, a metal hydroxide hardly soluble in water and a metal carbonate hardly soluble in water (third invention).

The present invention also provides transparent conductive films produced by these methods.

BEST MODE FOR CARRYING OUT THE INVENTION

First, the first invention will be explained in detail.

In the first invention of the present invention, metal nanoparticles are used. As the metal nanoparticles, metal nanoparticles containing two or more metallic elements are preferably used. Either composite metal nanoparticles containing all of the two or more metals in each particle or a mixture of nanoparticles with different metal compositions wherein each of the two or more metals is contained in at least one of the nanoparticles may be used (hereafter, the term "nanoparticles" is used as a concept including the both embodiments). Among them, composite metal nanoparticles are preferably used. In the present specification, the composite metal nanoparticles include any nanoparticles which have two or more metals in each nanoparticle. The two or more metals may exist with interacting with each other or one another, or they may independently exist. Specifically, there can be mentioned solid solutions, eutectic crystals, compounds or mixtures thereof, core-shell structures, simple heterogeneous mixtures and so forth. The nanoparticles need to have portions of metal exposed at surfaces. For example, even if a part of surfaces is oxidized or hydroxidized, the effect can be obtained so long as metal portions remain.

The particle size of the nanoparticles used for this invention is preferably 1-20 nm, more preferably 1-10 nm, in average. Further, when manifestation of various quantum size effects is utilized, so-called monodispersed particles are preferred. The monodispersed particles referred to in this invention preferably have a coefficient of variation of 30% or less, more preferably 20% or less, further preferably 10% or less. The mean particle size of the nanoparticles can be measured by using a transmission electron microscope (TEM).

In this invention, nanoparticles containing two or more metals belonging to Groups IIB, IIIB, IVB and VB of the 4th and 5th periods in the short period type periodic table of elements are preferably used. Specifically, composite metal nanoparticles of InSn, InZn, ZnSn, SbSn, ZnInSn and so forth and metal nanoparticles containing these metals in separate particles are preferred. Although all the atomic ratios are represented as integral ratios here, the atomic ratios are not limited to those and may be arbitrary ratios.

The aforementioned nanoparticles can be prepared by reducing two or more metal compounds with different metal species or two or more metal cations with different metal species in the presence of a reducing agent. Specifically, they can be obtained by dissolving and/or dispersing two or more metal compounds with different metal species in a desired ratio in a solvent and adding a suitable reducing agent to the solution or dispersion, if necessary, with heating and vigorous stirring. The temperature for the preparation of the nanoparticles is generally in the range of 5-95° C., and the reaction time is generally 10 minutes to 3 hours. pH of the solution before the addition of the reducing agent significantly affect reaction yield and composition of the particles to be prepared. The yield of the reaction can be confirmed by chemical analysis based on ICP, and the composition of each particle can be confirmed by high resolution TEM such as FE-TEM.

Examples of the metal compounds serving as the raw materials of the nanoparticles include metal halides, inorganic salts of metals such as sulfates and nitrates, organic acid salts such as formates and acetates and so forth. As the reducing agent, tetrahydroboric acid salts, dimethylamineborane, hydrazines and phosphinic acid salts are preferred, and tetrahydroboric acid salts are particularly preferred. Moreover, these reducing agents may be used in combination with a suitable catalyst or the like.

Examples of the solvent for dissolving and/or dispersing the nanoparticles include water; esters such as butyl acetate and cellosolve acetate; ketones such as methyl ethyl ketone, cyclohexanone and methyl isobutyl ketone; chlorinated hydrocarbons such as dichloromethane, 1,2-dichloroethane and chloroform; amides such as dimethylformamide; hydrocarbons such as cyclohexane, heptane, octane and isooctane; ethers such as tetrahydrofuran, ethyl ether and dioxane; alcohols such as ethanol, n-propanol, isopropanol, n-butanol and diacetone alcohol; fluorinated solvent such as 2,3,3,3-tetrafluoropropanol; glycol ethers such as ethylene glycol monomethyl ether, ethylene glycol monoethyl ether and propylene glycol monomethyl ether and so forth. These solvents can be used individually or in a combination of two or more of them considering dispersibility of colloidal particles in the solvents.

By the above reaction, a colloidal dispersion of composite metal nanoparticles containing two or more metals in individual particles or a mixture of metal nanoparticles containing two or more metals in different particles can be obtained. Since this colloidal dispersion contains impurities such as unreacted substances and reaction by-products, it is preferably used as a coating solution after it is subjected to ultrafiltration several times to remove the impurities. When washing is performed after the filtration, a washing solution that does not cause aggregation of colloid is used.

The colloidal dispersion preferably contains an organic compound such as an adsorptive compound (dispersing agent) or a surfactant. The adsorptive compound and surfactant adsorb on the surfaces of colloidal particles to modify the surfaces of the colloidal particles and thereby contribute to improvement of stability of the colloidal dispersion and retention of insulating property of the colloidal particles. The colloid may be either hydrophilic or hydrophobic. As the aforementioned adsorptive compound, compounds having —SH, —CN, —NH$_2$, —SO$_2$OH, —SOOH, —OPO(OH)$_2$, —COOH or the like are effective, and among these, adsorptive compounds having —SH or —COOH are preferred. For hydrophilic colloid, an adsorptive compound having a hydrophilic group (e.g., —SO$_3$M and —COOM (M represents a hydrogen atom, an alkali metal atom, an ammonium molecule etc.)) is preferably used. Further, the colloidal dispersion also preferably contain an anionic surfactant (e.g., sulfosuccinic acid bis(2-ethylhexyl) ester sodium salt, sodium dodecylbenzenesulfonate etc.), nonionic surfactant (e.g., alkyl esters of polyalkylene glycols, alkyl phenyl ethers etc.) fluorinated surfactant or hydrophilic polymer (e.g., hydroxyethylcellulose, polyvinylpyrrolidone, polyvinyl alcohol, polyethylene glycol, gelatin etc.).

The colloidal dispersion may be added with, besides the aforementioned organic compounds such as the adsorptive compound, various additives such as an antistatic agent, UV absorbent, plasticizer and polymer binder depending on the purpose.

The colloidal dispersion prepared as described above is preferably used as a coating solution after unnecessary salts in the colloidal dispersion are removed by a desalting method such as centrifugation, electrodialysis and ultrafiltration. For used as a coating solution, the colloidal dispersion preferably has an electric conductivity of 1,000 μS/cm or less, more preferably 100 μS/cm or less.

Then, the dispersion is adjusted to a desired concentration by further adding a solvent or concentrating the solvent and used as a coating solution.

The production method of this invention comprises a coating step for coating the aforementioned coating solution on a substrate to form a coated layer, a drying step for drying the coated layer and a baking step for baking the coated layer to obtain a transparent conductive electrode, and is characterized in that a metal in the nanoparticles is oxidized to a metal oxide during at least one of the coating step, the drying step and the baking step. The oxidation of the metal in the nanoparticles may advance during any one of the steps or two or more of the steps. The metal in the nanoparticles changes into metal oxide during at least one of the coating step, the drying step and the baking step, thus the particle volume increases, and the contact area of the particles increases. Further, the nanoparticles are fused one another during the baking step to form a transparent conductive film having high conductivity and high transparency. As a result, a transparent conductive film having low specific resistance and high light transmittance is obtained. Moreover, the production method of this invention does not require any large apparatus such as those used for vacuum deposition etc., and a transparent conductive film of large size can be easily produced. Therefore, it is particularly advantageous when the production is performed in a larger scale.

In the aforementioned coating step, the aforementioned coating solution is coated on a substrate to form a coated layer. The coating method is not particularly limited, and various methods such as spin coating, dip coating, extrusion coating and bar coating may be used. By carrying out the coating step in the presence of oxygen, for example, in air, the oxidation of the nanoparticles advances in the coating solution or on the substrate.

Examples of the material of the substrate used for the present invention include glass such as quartz glass, alkali free glass, crystallized transparent glass, Pyrex glass and sapphire; inorganic materials such as $Al_2O_3$, MgO, BeO, $ZrO_2$, $Y_2O_3$, $ThO_2$, CaO and GGG (gallium-gadolinium-garnet); polycarbonates; acrylic resins such as polymethyl methacrylate; vinyl chloride resins such as polyvinyl chloride and vinyl chloride copolymers; epoxy resins; polyarylates; polysulfones; polyethersulfones; polyimides; fluororesins; phenoxy resins; polyolefin resins; nylons; styrene resins; ABS resins; metals and so forth, and two or more kinds of these materials may be used in combination, if desired. Depending on use, a flexible substrate or a rigid substrate in the shape of film or the like can be used. In addition, the aforementioned substrate may have any shape, for example, disk shape, card shape, sheet shape and so forth.

Between the substrate and the transparent conductive film, an undercoat layer may be provided for the purposes of improvement of planarity of the substrate surface, improvement of adhesion, prevention of degradation of the transparent conductive film and so forth. Examples of the material of the undercoat layer include, for example, polymer materials such as polymethyl methacrylate, acrylic acid/methacrylic acid copolymers, styrene/maleic anhydride copolymers, polyvinyl alcohol, N-methylolacrylamide, styrene/vinyltoluene copolymers, chlorosulfonated polyethylene, cellulose nitrate, polyvinyl chloride, polyvinylidene chloride, chlorinated polyolefins, polyesters, polyimides, vinyl acetate/vinyl chloride copolymers, ethylene/vinyl acetate copolymers, polyethylene, polypropylene and polycarbonate; photo-curing or electron radiation-curing resins; surface-treating agents such as coupling agents and so forth. As the material of the aforementioned undercoat layer, a material showing excellent adhesion with the substrate and the transparent conductive film is preferred, and specifically, photo-curing or electron radiation-curing resins and coupling agents (e.g., silane coupling agents, titanate coupling agents, germanium coupling agents, aluminum coupling agents etc.) are preferred.

The undercoat layer can be prepared by dissolving and/or dispersing any of the aforementioned materials in a suitable solvent to prepare a coating solution and coating this coating solution on a substrate surface using a coating method such as spin coating, dip coating, extrusion coating and bar coating. The undercoat layer preferably has a thickness (dry thickness) of generally 0.001-20 μm, more preferably 0.005-10 μm.

After the aforementioned coating step, the coated layer is dried to remove the solvent in the coated layer. By drying the coated layer in the presence of oxygen, for example, in air, the oxidation of the metal nanoparticles in the coating solution advances. The term "drying step" is used to mean a step of removing the dispersion medium of the colloidal solution. The drying step may be performed as a part of another step. For example, when the baking is performed in the same reduced pressure environment as that used during the coating, an early stage of the baking step serves also as the drying step.

After the aforementioned drying step, the aforementioned coated layer is baked to form a transparent conductive film. By performing the baking in the presence of oxygen, for example, in air, the oxidation of the metal nanoparticles advances. By the baking, the metal nanoparticles in the coating solution are fused to form a continuous body, and organic compounds contained in the coating solution are removed by the baking to manifest conductivity. The baking can be performed by using, for example, an electric furnace or the like. In general, the baking temperature is preferably 100-600° C., more preferably 300-500° C., and the baking time is preferably 10 minutes to 4 hours, more preferably 20 minutes to 1 hour. In order to advance the oxidation of metal nanoparticles, they may also be baked in an inert gas atmosphere or nitrogen gas atmosphere after they are baked in air for a predetermined period of time.

The prepared transparent conductive film has high conductivity. The surface resistance of the transparent conductive film is preferably 500Ω/□ or less, more preferably 100Ω/□ or less. Moreover, the produced transparent conductive film has high light transmittance for lights of visible region, and the light transmittance at 550 nm is preferably 80% or more, more preferably 90% or more.

Although the thickness of the transparent conductive film is not particularly limited, it is preferably 5-1000 nm, more preferably 10-500 nm. When a large film thickness is desired, the coating may be performed multiple times as required.

Further, although preferred range of the content of metal or composite metal in the transparent conductive film may vary depending on the type of metal used and purpose of the film, in general, it is preferably 10-10000 mg/m$^2$, more preferably 20-5000 mg/m$^2$.

The transparent conductive film of this invention can be used, after it is subjected to a processing such as patterning, if desired, for electrodes of liquid crystal display devices (LCD), touch panels, plasma display panels (PDP), electroluminescence (EL) devices and so forth.

Hereafter, the second invention will be explained.

The second invention is characterized in that a colloidal dispersion containing nanoparticles is coated on a substrate, dried and subjected to laser irradiation. The colloidal dispersion used for the second invention contains (1) nanoparticles containing at least one substance selected from a metal oxide hardly soluble in water, a metal hydroxide hardly soluble in water and a metal carbonate hardly soluble in water and nanoparticles containing a metal, and/or (2) composite nanoparticles each containing both of a metal and at least one substance selected from a metal oxide hardly soluble in water, a metal hydroxide hardly soluble in water and a metal carbonate hardly soluble in water. Therefore, the colloidal dispersion used for this invention may contain nanoparticles comprising two or more metal atoms in each one particle, or may contain nanoparticles comprising compounds of a different composition in each one particle. Or the colloidal dispersion may contain nanoparticles each of which particle has a core-shell structure where the core and shell contain compounds in different compositions. Further, the nanoparticles may consist of a mixture of two or more kinds of nanoparticles having different compositions. In addition, the nanoparticless used in this invention may contain particles in which all or a part of each particle consists of 0-valent metal component.

Specific embodiments of the colloidal dispersion used in this invention include one containing at least one type of nanoparticles selected from (1) a mixture of metal nanoparticles and at least one of nanoparticles of a metal oxide hardly soluble in water, nanoparticles of a metal hydroxide hardly soluble in water and nanoparticles of a metal carbonate hardly soluble in water, (2) composite nanoparticles each containing a metal core and a shell formed thereon and containing at least one of a metal oxide hardly soluble in water, a metal hydroxide hardly soluble in water and a metal carbonate hardly soluble in water, (3) composite nanoparticles each containing a core containing at least one of a metal oxide hardly soluble in water, a metal hydroxide hardly soluble in water and a metal carbonate hardly soluble in water and a shell formed thereon and containing a metal and (4) composite nanoparticles each containing a metal and at least one of a metal oxide hardly soluble in water, a metal hydroxide hardly soluble in water and a metal carbonate hardly soluble in water, and one containing (5) a mixture of two or more of the aforementioned nanoparticles (2) to (4).

The mean particle size of the nanoparticles used for this invention is preferably 1-20 nm. If the mean particle size is less than 1 nm, the particles become unstable, and coalescence of the particles tends to occur during coating and drying. On the other hand, if the mean particle size is more than 20 nm, crystallization of particles tends to require large light energy. The mean particle size of the nanoparticles used for this invention is more preferably 2-10 nm. The nanoparticles used in this invention are desirably monodispersed particles having a coefficient of variation of 30% or less, preferably 20% or less, more preferably 10% or less.

The metal atoms constituting the nanoparticles used in this invention are preferably selected from those of Groups IIIA, IVA, VA, VIA, VIIA, VIII, IB, IIB, IIIB, IVB and VB. In particular, metals of Groups VIII and IB are preferred in view of conductivity, and metals of Groups IIB, IIIB, IVB and VB are preferred in view of transparency. Specifically, it is preferable to select two or more metals from In, Ga, Al, Sn, Ge, Sb, Bi, Zn, Au, Ag, Pt and Pd. Although the 0-valent metal atoms that may be contained in at least a part of the nanoparticles may be any one of these metals, Au, Ag, Pt and Pd, which are hardly oxidized and show high stability, are particularly preferred. As described above, these metals may exist uniformly in composite nanoparticles, or they may be localized in the core or shell. Moreover, they may separately exist as metal nanoparticles.

The aforementioned metal nanoparticles can be obtained by dissolving a metal compound in a hydrophilic solvent such as water and alcohols and adding a suitable reducing agent to the solution with heating or cooling if necessary. Although the synthesis conditions differ depending on types of metal and reducing agent and may be selected from wide ranges, temperature is desirably −20-95° C., reaction time is desirably 10 seconds to 3 hour, and pH is desirably 3-11.

Examples of the metal compound used as the raw material of the aforementioned nanoparticles include metal halides, inorganic acid salts such as sulfates and nitrates, organic acid salts such as acetates, oxalates and tartrates and so forth. As the reducing agent, there can be used inorganic reducing agents such as tetrahydroboric acid salts, dimethylaminoborane, hydrazines and phosphinic acid salts and organic reducing agents such as amine compounds and diol compounds.

Moreover, the nanoparticles can also be prepared by the evaporation-in-gas method in which raw material solid is put into a crucible and heated by high frequency induction heating to generate metal vapor, and the vapor is rapidly cooled by collision with gas molecules such as those of He and Ar and thereby made into fine particles. Furthermore, metal in the metal nanoparticles formed by the aforementioned method may be replaced with a metal having an oxidation reduction potential higher than that of the metal contained in the nanoparticles by adding a salt of the metal having an oxidation reduction potential higher than that of the metal contained in the nanoparticles to the nanoparticles.

The metal oxide hardly soluble in water can be prepared by a vapor phase method such as the microwave plasma chemical vapor deposition method and the aforementioned deposition-in-gas method, spray thermal decomposition method or the like. Further, the metal oxide hardly soluble in water can also be prepared by heating nanoparticles of a metal hydroxide hardly soluble in water or nanoparticles of a metal carbonate hardly soluble in water prepared by the liquid phase method described later.

Nanoparticles of metal hydroxide hardly soluble in water and nanoparticles of metal carbonate hardly soluble in water can be obtained by dissolving a halide, organic acid salt such as sulfate or nitrate, organic acid salt such as acetate, oxalate or tartrate of the metal or the like in a hydrophilic solvent such as water or an alcohol and subjecting the solution to a treatment with an alkali such as lithium hydroxide, sodium hydroxide, potassium hydroxide, tetramethylammonium hydroxide, sodium carbonate, potassium carbonate, sodium hydrogencarbonate, potassium hydrogencarbonate, guanidine carbonate or aqueous ammonia. Although the synthesis conditions differ depending on type of chemical species and may be selected from wide ranges, temperature is desirably −20-95° C., reaction time is desirably 10 seconds to 3 hour, and pH is desirably 3-11.

The expression "hardly soluble in water" used in this specification means solubility in 100 ml of water at 25° C. of 0.1 g or less.

The yield of the reaction can be confirmed by chemical analysis based on ICP or the like, and the composition of each particle can be confirmed by high resolution TEM such as FE-TEM.

The nanoparticles prepared by the vapor phase method or the spray thermal decomposition method can be made into a colloidal dispersion by dispersing them in a suitable dispersion medium. Since the nanoparticles prepared by the liquid phase method is obtained as a colloidal dispersion, it may be used as it is, or it may be used after it is subjected to various treatments including concentration, purification, dilution, desalting and so forth for the purpose of removing unreacted substances and by-products or controlling the concentration.

The colloidal dispersion preferably contains an organic compound such as an adsorptive compound (dispersing agent) and surfactant as in the first invention. Moreover, the colloidal dispersion may be added with various additives such as an antistatic agent, UV absorbent, plasticizer and polymer binder depending on the purpose. Further, conductivity of the colloidal dispersion is preferably adjusted to a predetermined level by removing unnecessary salts in the colloidal dispersion by centrifugation or the like as in the first invention.

A transparent conductive film can be formed by coating the aforementioned colloidal dispersion on a substrate, drying the coated layer and subjecting the coated layer to laser irradiation. The coating method is not particularly limited, and various methods such as spin coating, dip coating, extrusion coating and bar coating may be used. Further, as for the material of the substrate and the formation of undercoat layer, the explanations of the first invention can be referred to.

The light transmittance at 550 nm of the transparent conductive film is desirably 60% or more, more desirably 70% or more. Further, the light transmittance is desirably 50% or more for the whole visible light region of 400-700 nm.

Further, the surface resistance of the transparent conductive film is preferably 1 kΩ/□ or less, more preferably 500Ω/□ or less.

Although the thickness and metal atom content of the transparent conductive film are not particularly limited, in general, the thickness is preferably 5-1000 nm, more preferably 10-500 nm, and the metal atom content is preferably 10-10000 mg/m$^2$, more preferably 20-5000 mg/m$^2$.

Although the laser light to be irradiated on a thin film obtained by coating the nanoparticle colloid and drying the coated layer may have an arbitrary wavelength so long as the nanoparticle colloid absorbs the light, it is preferably an infrared light of 700-1700 nm and/or a ultraviolet light at 360 nm or less. Typical examples of the laser include semiconductor lasers such as AlGaAs and InGaAsP lasers, Nd:YAG laser, excimer lasers such as ArF, KrF and XeCl lasers, dye lasers and so forth. It was found that, when the thin film was subjected to laser irradiation, heat was generated and the metal oxide was crystallized at the irradiated portion, and as a result, the surface resistance of the irradiated portion was decreased in one digit order compared with a non-irradiated portion. In addition, since the thin film contains the metal nanoparticles, it is likely to absorb a laser light, and it also has high heat conduction. Therefore, it has an advantage that the crystallization of the metal oxide can be caused with smaller energy. Moreover, it was also found that since the mean particle size of the nanoparticles was as small as 1-20 nm, the crystallization of the metal oxide was caused at a low temperature, and therefore the transparent conductive film could be obtained with laser irradiation of low output for a short period of time.

The third invention was provided based on these findings. Only by performing the laser irradiation in the second invention in a desired pattern, a transparent electrode film in the desired pattern can be obtained. In addition, after the laser irradiation, the non-irradiated portion of the thin film may be remained as it is, or it may also be removed by washing, etching or the like. If a pattern is formed in a shape of circuit by using the third invention, formation of a conductive film and preparation of a circuit can be performed simultaneously.

Since a transparent conductive film can be obtained without any heat treatment at high temperature according to the second invention and the third invention, they are extremely useful in that a transparent conductive film can be quickly formed in a simple manner even on a substrate having low heat resistance such as a plastic substrate. When a transparent conductive film is formed by the conventional sol-gel method, a high temperature heat treatment at several hundreds degrees C. is required. Therefore, a substrate of low heat resistance cannot be used. Moreover, although there is the photolithography method as means for avoiding a high temperature heat treatment, patterning process in this method is complicated and time-consuming, and therefore it has a problem that the productivity is degraded. According to the present invention, these problems of conventional techniques can be solved.

The present invention will be explained more specifically with reference to the following preparation examples, examples and comparative examples. Preparation Examples 1 to 4 and Example 1 are described for explaining the first invention, and Preparation Examples 5 to 9 and Examples 2 to 6 are described for explaining the second invention. The materials, regents, amounts and ratios of substances, procedures etc. mentioned in the following preparation examples and examples may be suitably changed so long as such change does not depart from the spirit of the present invention. Therefore, the present invention no way limited by the following specific examples.

PREPARATION EXAMPLE 1

Preparation of Sn/In Composite Nanoparticles using NaBH$_4$

In an amount of 4.97 g of indium(III) chloride, 0.877 g of tin(IV) chloride pentahydrate, 10.1 g of L-tartaric acid were dissolved in 250 mL of deoxygenated water and sufficiently stirred to prepare Solution A-1. Further, 13.4 g of potassium hydroxide was dissolved in 200 mL of deoxygenated water and sufficiently stirred to prepare Solution B. Furthermore, 7.15 g of sodium tetrahydroborate was dissolved in 50 mL of deoxygenated water and sufficiently stirred to prepare Solution C. At room temperature, Solution A-1 and Solution B were mixed in a 500 mL three-neck flask and sufficiently stirred. pH of the mixed solution was 8.5. When Solution C, which was a reducing agent, was added to the mixed solution, the solution immediately foamed. When the reaction vessel was placed in a thermostat to elevate the temperature, reduction started. The transparent solution changed into a blackish brown solution, and thus a dispersion of Sn/In composite nanoparticles was obtained. The reaction was performed at 60° C. for 60 minutes, and after completion of the reaction, the temperature was decreased to room temperature by spontaneous cooling.

PREPARATION EXAMPLE 2

Preparation of Sb/Sn Composite Nanoparticles using NaBH$_4$

In an amount of 7.89 g of tin(IV) chloride pentahydrate, 0.57 g of antimony(III) chloride and 10.1 g of L-tartaric acid were dissolved in 250 mL of deoxygenated water and sufficiently stirred to prepare Solution A-2. Further, 13.4 g of potassium hydroxide was dissolved in 200 mL of deoxygenated water and sufficiently stirred to prepare Solution B. Furthermore, 7.15 g of sodium tetrahydroborate was dissolved in 50 mL of deoxygenated water and sufficiently stirred to prepare Solution C. At room temperature, Solution A-2 and Solution B were mixed in a 500 mL three-neck flask and sufficiently stirred. pH of the mixed solution was 8.5. When Solution C, which was a reducing agent, was added to the mixed solution, the solution immediately foamed. When the reaction vessel was placed in a thermostat to elevate the temperature, reduction started. The transparent solution changed into a blackish brown solution, and thus a dispersion of Sb/Sn composite nanoparticles was obtained. The reaction was performed at 60° C. for 60 minutes, and after completion of the reaction, the temperature was decreased to room temperature by spontaneous cooling.

PREPARATION EXAMPLE 3

Preparation of Sn/In Hydroxide Particles

In an amount of 4.97 g indium(III) chloride and 0.877 g of tin(IV) chloride pentahydrate were dissolved in 250 mL of deoxygenated water and sufficiently stirred to prepare Solution A-3. Solution A-3 was placed in a 500 mL three-neck flask and added dropwise with 12% aqueous ammonia with cooling at 0° C. to obtain a dispersion of Sn/In hydroxide particles. pH of the solution was 8.5, an the reaction time was 60 minutes.

PREPARATION EXAMPLE 4

Preparation of Sb/Sn Hydroxide Particles

In an amount of 7.89 g of tin(IV) chloride pentahydrate and 0.57 g of antimony(III) chloride were dissolved in 250 mL of deoxygenated water and sufficiently stirred to prepare Solution A-4. Solution A-4 was placed in a 500 mL three-neck flask and added dropwise with 12% aqueous ammonia with cooling at 0° C. to obtain a dispersion of Sb/Sn hydroxide particles. pH of the solution was 8.5, an the reaction time was 60 minutes.

EXAMPLE 1

After the preparation of the composite nanoparticles of Preparation Examples 1-4, each solution was left standing under nitrogen atmosphere until the precipitates and the supernatant were completely separated. After only the supernatant was discarded, the precipitates were added with an appropriate amount of deoxygenated water, stirred and then left standing again to separate the precipitates and the supernatant. This procedure was repeated until the electric conductivity of the supernatant became 10 μS/cm or less. Finally, the precipitates were further concentrated by centrifugation. The centrifugation was performed at 2000 rpm for 5 minutes. After the centrifugation, the supernatant was discarded, and the precipitates were added with water to obtain an appropriate concentration and adjusted to pH 4 with acetic acid and aqueous ammonia. When this solution was vigorously stirred in air, the blackish brown solution became a light yellow transparent solution in the cases of the samples of Examples 1 and 2 (Colloids 1 and 2), and the cloudy solution became a transparent solution in the cases of the samples of Examples 3 and 4 (Colloids 3 and 4). The mean particle sizes of the particles obtained as described above were 3.5 nm for Colloid 1, 3.8 nm for Colloid 2, 3.4 nm for Colloid 3 and 3.6 nm for Colloid 4.

In a volume of 0.5 mL of each of the prepared dispersions of Colloid 1 to 4 was placed on a 50 mm×50 mm glass substrate and spin-coated on the substrate at a rotation number of 500-2000 rpm for 20 seconds. The thin film obtained as described above was dried at 80° C. for 2 hours. The thin film after the drying was baked at 500° C. for 30 minutes under air atmosphere and then further baked at 500° C. for 30 minutes under argon atmosphere using an electric furnace. XRD of samples obtained by coating Colloid 1 or Colloid 3, drying and baking it under the aforementioned conditions showed a peak of crystalline ITO. Further, XRD of samples obtained by coating Colloid 2 or Colloid 4, drying and baking it under the aforementioned conditions showed a peak of crystalline ATO.

For the baked thin films, specific resistance was measured by using Loresta-GP MCP-T600 produced by Mitsubishi Petrochemical, and light transmittance was measured by using UV-3100PC produced by Shimadzu. The values of surface resistance, thickness and light transmittance of the samples were summarized in Table 1.

TABLE 1

| Sample | Material | Surface resistance (Ω/□) | Film thickness (μm) | Light transmittance (550 nm) |
|---|---|---|---|---|
| Colloid 1 (Invention) | ITO | 70 | 0.52 | 0.85 |
| Colloid 2 (Invention) | ATO | 500 | 0.56 | 0.89 |
| Colloid 3 (Comparative) | ITO | 350 | 0.54 | 0.79 |
| Colloid 4 (Comparative) | ATO | 900 | 0.52 | 0.82 |

PREPARATION EXAMPLE 5

Preparation of Sn/In Composite Nanoparticles

In an amount of 2.00 g of indium(III) chloride, 0.36 g of tin(IV) chloride pentahydrate and 4.05 g of L-tartaric acid were dissolved in 100 mL of deoxygenated water and sufficiently stirred to prepare Solution A-1. Further, 5.3 g of potassium hydroxide was dissolved in 100 mL of deoxygenated water to prepare Solution B-1. Furthermore, 2.88 g of sodium tetrahydroborate was dissolved in 20 mL of deoxygenated water to prepare Solution C-1. In an argon box at room temperature, Solution A-1 and Solution B-1 were placed in a 300 mL three-neck flask and mixed. pH of the mixed solution was 8.5. When Solution C, which was a reducing agent, was added to the mixed solution, and then the reaction vessel was placed in a thermostat to elevate the temperature, reduction started, and the transparent solution changed into a blackish brown solution. The reaction was performed at 60° C. for 60 minutes, and the temperature was decreased to room temperature by spontaneous cooling.

Washing with water using centrifugation was repeated until the electric conductivity of the supernatant became 50 μS/cm or less. The precipitates were dispersed again in 20 ml of 0.5% aqueous solution of hydroxyethylcellulose to prepare a colloidal dispersion. When the particles in the dispersion were observed by TEM, the mean particle size was 4 nm.

PREPARATION EXAMPLE 6

Preparation of Pt/Sn/In Composite Nanoparticles

Solution D-1 was prepared by dissolving 0.04 g of chloroplatinic(IV) acid hexahydrate in 10 mL of deoxygenated water. In an argon box at room temperature, Solution A-1 of Preparation Example 5, Solution D-1 and Solution B-1 of Preparation Example 5 were put into a 300 mL three-neck flask in this order and mixed. pH of the mixed solution was 8.3. This mixed solution was cooled to 3° C. with ice, added with Solution C-1 of Preparation Example 5, which was a reducing agent, and allowed to react for 60 minutes with stirring. The transparent solution changed into a blackish brown solution. Then, the temperature was elevated spontaneously to room temperature.

As in Preparation Example 5, washing with water using centrifugation was repeated until the electric conductivity of the supernatant became 50 μS/cm or less, and the precipitates were dispersed again in 20 ml of 0.5% aqueous solution of hydroxyethylcellulose to prepare a colloidal dispersion.

When the particles in the dispersion were observed by TEM, the mean particle size was 4 nm.

PREPARATION EXAMPLE 7

Preparation of Ag Nanoparticles

In 800 mL of deoxygenated water, 3.4 g of silver nitrate and 12.6 g of citric acid monohydrate were dissolved to prepare Solution A. Separately, 3.8 g of iron(II) chloride was dissolved in 50 mL of deoxygenated water to prepare Solution B. To Solution A stirred in an argon box, the whole volume of Solution B was added and stirred for 15 minutes to obtain a yellowish brown reaction product. The reaction mixture was concentrated to a volume of about 50 mL by ultrafiltration. Then, the concentrated reaction mixture was added with 200 mL of water and concentrated to a volume of about 50 mL by subjecting it to ultrafiltration 5 times. The obtained colloidal dispersion of Ag nanoparticles showed an electric conductivity of 40 µS/cm. Further, when the obtained nanoparticles were observed by TEM, the mean particle size was 5 nm.

PREPARATION EXAMPLE 8

Preparation of $Sn(OH)_4/In(OH)_3$ Composite Nanoparticles

In an amount of 2.22 g of indium(III) chloride and 0.40 g of tin(IV) chloride pentahydrate were dissolved in 200 mL of water and stirred with ice cooling. This solution was added with 5 mol/L sodium hydroxide solution preliminarily cooled to about 2° C. until pH became 6.5, and stirring was continued at the same temperature for 15 minutes. A milk white colloidal dispersion of $Sn(OH)_4/In(OH)_3$ nanoparticles was obtained. The dispersion was repeatedly subjected to ultrafiltration until the electric conductivity became 50 µS/cm or less with cooling and finally concentrated to a volume of about 20 mL. The obtained nanoparticles were found to have a mean particle size of 6 nm by TEM observation.

PREPARATION EXAMPLE 9

Preparation of Composite Nanoparticles Containing Carbonate and Hydroxide of Sn/In A colloidal dispersion of nanoparticles was obtained in the same manner as in Preparation Example 8 except that 10 weight % potassium carbonate solution was used instead of the 5 mol/L sodium hydroxide solution used in Preparation Example 8. It was found that these nanoparticles contain a mixture of carbonate and hydroxide of Sn(IV)/In(III) based on the infrared absorption spectrum and the results of elemental analysis. When the obtained nanoparticles were observed by TEM, the mean particle size was 6 nm.

EXAMPLE 2

Formation of ITO Transparent Conductive Film

A 20 weight % solution of a silane coupling agent, aminopropyltriethoxysilane (solvent was a 95/5 (weight ratio) mixture of 2-ethoxyethanol and water) was coated on a polycarbonate resin substrate (size: φ130 mm, thickness: 0.6 mm, produced by Teijin) and dried to form an undercoat layer having a thickness of 200 nm. On this undercoat layer, the colloidal dispersion of Sn/In composite nanoparticles of Preparation Example 5 was coated and then dried to form a thin film having a thickness of 500 nm. When the atomic valences of the metals contained in this thin film were analyzed by XPS, it was found that Sn existed as 0-valent metal, and In existed as a mixture of 0-valent metal and hydroxide (trivalent).

Further, X-ray diffraction pattern was not obtained for this thin film.

The aforementioned thin film was irradiated with a laser beam at a line speed of 5 m/second by using a semiconductor laser apparatus of an oscillation wavelength of 803 nm, output of 50 mW and a spot diameter of 1 µm (produced by Pulstec). When the film was observed by using a laser microscope, the nanoparticles in the irradiated portion were fused to form a continuous layer. When whole surface of another substrate identical to the aforementioned substrate was irradiated with a laser beam, and surface resistance was measured, it was found that the surface resistance was 350Ω/□ along the laser scanning direction and 570Ω/□ along the direction perpendicular thereto. In addition, the surface resistance of the substrate that was not subjected to the irradiation was $10^7$Ω/□ or more. Further, the light transmittance at 550 nm of the irradiated portion was 76%, and an X-ray diffraction pattern of ITO was observed.

EXAMPLE 3

Formation of ITO Transparent Conductive Film Under Other Conditions

The laser irradiation was performed by using a XeCl excimer laser of an oscillation wavelength of 308 nm, output of 50 mJ/cm² and irradiation area of 300 mm×0.4 mm (produced by JSW) for 20 pulses (400 nanoseconds). For the irradiated portion, an X-ray diffraction pattern of ITO crystal was observed, the surface resistance was 400Ω/□, and the light transmittance at 550 nm was 75%.

EXAMPLE 4

Formation of Zn/In Transparent Conductive Film

Zn/In composite nanoparticles (mean particle size: 5 nm) were prepared in the same manner as in Preparation Example 5 except that 0.14 g of zinc(II) chloride was used instead of 0.36 g of tin(IV) chloride pentahydrate. An undercoat layer was provided on a polycarbonate substrate in the same manner as in Example 2, and Zn/In composite nanoparticle colloid was coated so that a dry film thickness of 500 nm should be obtained and dried. It was found that both of Zn and In existed as 0-valent metal and di- and tetravalent hydroxide in this thin film based on the XPS analysis. The film was subjected to irradiation by using the excimer laser apparatus used in Example 3 for 20 pulses. For the irradiated portion, the surface resistance was 720Ω/□, and the light transmittance at 550 nm was 79%.

EXAMPLE 5

Formation of Pt/ITO Transparent Conductive Film

A 20 weight % solution of a silane coupling agent, aminopropyltriethoxysilane (solvent was a 95/5 (weight ratio) mixture of 2-ethoxyethanol and water) was coated on a polyethersulfone substrate (size: 100 mm square, thickness: 0.2 mm, produced by Sumitomo Bakelite) and dried to form an undercoat layer having a thickness of 200 nm. On this undercoat layer, the colloidal dispersion of Pt/Sn/In composite nanoparticles of Preparation Example 6 was coated and then dried to form a thin film having a thickness of 500 nm. When the atomic valences of the metals contained in this thin film were analyzed by XPS, it was found that Pt existed as 0-valent metal, and Sn and In existed as a mixture of 0-valent metal and hydroxide (trivalent).

Further, X-ray diffraction pattern was not obtained for this thin film.

In the same manner as in Example 3, the aforementioned thin film was irradiated with a laser beam of an oscillation wavelength of 803 nm for 20 pulses. As a result, an X-ray diffraction pattern was observed, and a transparent conductive film having a surface resistance of 280Ω/□ and a light transmittance of 70% was obtained.

EXAMPLE 6

Formation of Transparent Conductive Film

The nanoparticle colloidal dispersions of Sn (IV)/In (III) prepared in Preparation Examples 8 and 9 were added with lime-treated gelatin to a concentration of 0.5 weight % to prepare coating solutions. Separately, these coating solutions were added with the Ag nanoparticle colloid of Preparation Example 7 so that the atomic ratio of Ag with respect to the In content should become 0.5 atom % and mixed to prepare coating solutions.

In the same manner as in Example 5, an undercoat layer was prepared on a polyethersulfone substrate, and each of the above colloidal dispersions was coated on it so that a dry thickness of 500 nm should be obtained and dried. When the films were irradiated by using an excimer laser at 308 nm for 20 pulses, an X-ray diffraction pattern of ITO was obtained for all of the films. However, the films not containing the Ag nanoparticles showed a high surface resistance of $6-8 \times 10^3 \Omega/\square$, whereas the surface resistance of the films containing the Ag nanoparticles was lower in one digit order. In addition, the substrates not containing the Ag nanoparticles showed a light transmittance at 550 nm of 80%, and the substrates containing the Ag nanoparticles showed a light transmittance at 550 nm of 74%.

It was found that, if Ag of atomic valence of 0 is contained, the surface resistance is markedly decreased.

EXAMPLE 7

Formation of ITO Transparent Conductive Film by Heat Treatment Method

An ITO precursor thin film was formed in the same manner as in Example 2 except that a silicon wafer was used instead of the polycarbonate substrate. The silicon wafer was subjected to a heat treatment in air at 430° C. for 20 minutes, and then subjected to a heat treatment in argon at 430° C. for 30 minutes. After the wafer was cooled to room temperature, surface resistance was measured and found to be 380Ω/□, and an X-ray diffraction pattern of ITO was observed. Further, the light transmittance at 550 nm was 75%.

The present disclosure relates to the subject matter contained in Japanese Patent Application No. 049633/2002 filed on Feb. 26, 2002 and Japanese Patent Application No. 049634/2002 filed on Feb. 26, 2002, which is expressly incorporated herein by reference in its entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A method for producing a transparent conductive film which comprises the steps of coating a colloidal dispersion of metal nanoparticles on a substrate to form a coated layer, drying the coated layer and subjecting the coated layer to laser irradiation, wherein the colloidal dispersion comprises a mixture of nanoparticles consisting of a 0-valent metal selected from the group consisting of Au, Ag, Pt and Pd and nanoparticles comprising at least one substance selected from the group consisting of a metal oxide hardly soluble in water, a metal hydroxide hardly soluble in water and a metal carbonate hardly soluble in water, wherein the laser irradiation is effective to fuse the nanoparticles in the irradiated portion to form a continuous layer, wherein the nanoparticles which comprise at least one substance selected from the group consisting of a metal oxide hardly soluble in water, a metal hydroxide hardly soluble in water and a metal carbonate hardly soluble in water, comprise two or more metals selected from the group consisting of In, Ga, Al, Sn, Ge, Sb, Bi, and Zn.

2. The method for producing a transparent conductive film according to claim 1, wherein the metal nanoparticles contained in the colloidal dispersion have a mean particle size of 1-20 nm.

3. The method for producing a transparent conductive film according to claim 1, wherein the laser irradiation is performed with a laser beam of an infrared light having a wavelength of 700-1700 nm.

4. The method for producing a transparent conductive film according to claim 1, wherein the laser irradiation is performed with a laser beam of an ultraviolet light having a wavelength of 360 nm or less.

5. The method for producing a transparent conductive film according to claim 1, wherein the colloidal dispersion contains composite metal nanoparticles each constituted by (1) a core containing a 0-valent metal selected from Au, Ag, Pt and Pd, and (2) a shell formed on the core and containing at least one substance selected from the group consisting of a metal oxide hardly soluble in water, metal hydroxide hardly soluble in water and metal carbonate hardly soluble in water, wherein the metals constituting the metal oxide, the metal hydroxide and metal carbonate are selected from the group consisting of In, Ga, Al, Sn, Ge, Sb, Bi and Zn.

6. The method for producing a transparent conductive film according to claim 1, wherein the colloidal dispersion contains composite metal nanoparticles each constituted by (1) a core containing at least one substance selected from the group consisting of metal oxide hardly soluble in water, metal hydroxide hardly soluble in water and metal carbonate hardly soluble in water, wherein the metals constituting the metal oxide, the metal hydroxide and metal carbonate are selected from the group consisting of In, Ga, Al, Sn, Ge, Sb, Bi and Zn, and (2) a shell formed on the core and containing a 0-valent metal selected from the group consisting of Au, Ag, Pt and Pd.

7. A method for forming a pattern of a transparent conductive film which comprises the steps of coating a colloidal dispersion of metal nanoparticles on a substrate to form a coated layer, drying the coated layer and subjecting the coated layer to laser irradiation according to the pattern, wherein the colloidal dispersion comprises a mixture of nanoparticles consisting of a 0-valent metal selected from the group consisting of Au, Ag, Pt and Pd and nanoparticles comprising at least one substance selected from the group consisting of a metal oxide hardly soluble in water, a metal hydroxide hardly soluble in water and a metal carbonate hardly soluble in water, wherein the laser irradiation is effective to fuse the nanoparticles in the irradiated portion to form a continuous layers wherein the nanoparticles which comprise at least one substance selected from the group consisting of a metal oxide hardly soluble in water, a metal hydroxide hardly soluble in water and a metal carbonate hardly soluble in water, comprise two or more metals selected from the group consisting of In, Ga, Al, Sn, Ge, Sb, Bi, and Zn.

* * * * *